United States Patent
Laube et al.

(10) Patent No.: US 10,830,116 B2
(45) Date of Patent: Nov. 10, 2020

(54) EXHAUST GAS SYSTEM AND METHOD FOR OPERATING AN EXHAUST GAS SYSTEM

(71) Applicant: Dr. Ing. h.c. F. Porsche Aktiengesellschaft, Stuttgart (DE)

(72) Inventors: Thomas Laube, Leonberg (DE); Michael Wessels, Bietigheim-Bissingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 36 days.

(21) Appl. No.: 16/360,198

(22) Filed: Mar. 21, 2019

(65) Prior Publication Data

US 2019/0292964 A1    Sep. 26, 2019

(30) Foreign Application Priority Data

Mar. 21, 2018    (DE) .......... 10 2018 106 588

(51) Int. Cl.
| | |
|---|---|
| *F01N 3/20* | (2006.01) |
| *F01N 13/14* | (2010.01) |
| *B01D 53/94* | (2006.01) |
| *F02N 11/08* | (2006.01) |
| *F01N 9/00* | (2006.01) |

(52) U.S. Cl.
CPC ....... *F01N 3/2053* (2013.01); *B01D 53/9495* (2013.01); *F01N 3/2013* (2013.01); *F01N 9/00* (2013.01); *F01N 13/14* (2013.01); *F02N 11/0803* (2013.01); *F01N 2410/06* (2013.01);
(Continued)

(58) Field of Classification Search
CPC ........ F01N 3/20; F01N 3/2013; F01N 3/2053; F01N 9/00; F01N 13/14; F01N 2240/16; F01N 2240/36; F01N 2410/03; F01N 2410/06; F01N 2900/08; F01N 2900/1602; F02N 11/0803; F02N 11/0818;
(Continued)

(56) References Cited

U.S. PATENT DOCUMENTS

| | | | | |
|---|---|---|---|---|
| 5,489,319 | A | * | 2/1996 | Tokuda .................. F01N 3/027 55/282.3 |
| 5,900,043 | A | * | 5/1999 | Grandjean ............... B03C 3/74 95/29 |

(Continued)

FOREIGN PATENT DOCUMENTS

| | | |
|---|---|---|
| DE | 1 188 373 | 3/1965 |
| GB | 2 254 014 | 9/1992 |
| WO | 96/10686 | 4/1996 |

OTHER PUBLICATIONS

Machine translation DE 1 188 373 (Year: 2020).*

*Primary Examiner* — Audrey K Bradley
*Assistant Examiner* — Dapinder Singh
(74) *Attorney, Agent, or Firm* — Gerald E. Hespos; Michael J. Porco; Matthew T. Hespos

(57) ABSTRACT

An exhaust gas system (1) has a main flow path (2) with an exhaust gas aftertreatment device (4), and a bypass flow path (3) that has a fan (5) and a heating apparatus (6). The bypass flow path (3) has opposite ends connected to the main flow path (2) in regions upstream and downstream of the exhaust gas aftertreatment device (4). A shut-off (7) is arranged in the main flow path (2) upstream of the bypass flow path, and a further shut-off (8) is arranged in the main flow path downstream of the bypass flow path.

14 Claims, 1 Drawing Sheet

(52) U.S. Cl.
CPC .. *F01N 2900/08* (2013.01); *F01N 2900/1602* (2013.01); *F02N 2200/026* (2013.01)

(58) Field of Classification Search
CPC ....... F02N 2200/026; F02N 2300/2011; B01D 53/9494; B01D 53/9495
USPC .......................... 60/274, 286, 295, 299, 300
See application file for complete search history.

(56) References Cited

U.S. PATENT DOCUMENTS

| | | | | |
|---|---|---|---|---|
| 6,832,473 B2* | 12/2004 | Kupe | ................ | B01D 53/9495 60/274 |
| 7,117,669 B2* | 10/2006 | Kaboord | ............... | F01N 3/0807 60/288 |
| 7,251,932 B2* | 8/2007 | Huang | ................... | F01N 3/031 60/274 |
| 7,735,314 B2* | 6/2010 | Lu | ........................ | F01N 13/009 60/287 |
| 8,608,834 B2* | 12/2013 | Sellers | ............... | B01D 46/0064 55/282.2 |
| 9,151,202 B2* | 10/2015 | Norris | ................... | F01N 3/2066 |
| 2004/0076566 A1* | 4/2004 | Unger | ............... | B01D 53/9431 423/235 |
| 2006/0096281 A1* | 5/2006 | Huang | .................. | F01N 3/0878 60/297 |
| 2007/0199311 A1* | 8/2007 | Kalish | .................... | F01N 3/035 60/295 |
| 2011/0162358 A1* | 7/2011 | Bruck | ..................... | F01N 13/14 60/605.1 |
| 2011/0252765 A1* | 10/2011 | Makartchouk | ........ | F01N 3/0235 60/274 |
| 2014/0053547 A1* | 2/2014 | Wade | .................... | F02B 39/12 60/599 |
| 2016/0003133 A1* | 1/2016 | Mihara | .................. | F02D 41/10 123/568.11 |
| 2018/0023450 A1* | 1/2018 | Zhang | .................... | F01N 3/021 60/602 |

* cited by examiner

EXHAUST GAS SYSTEM AND METHOD FOR OPERATING AN EXHAUST GAS SYSTEM

CROSS REFERENCE TO RELATED APPLICATION

This application claims priority under 35 USC 119 to German Patent Appl. No. 10 2018 106 588.4 filed on Mar. 21, 2018, the entire disclosure of which is incorporated herein by reference.

BACKGROUND

Field of the Invention

The invention relates to an exhaust gas system having an exhaust gas aftertreatment device. The invention also relates to a method for operating an exhaust gas system.

Related Art

Three way catalytic converters represent the state of the art in efforts to lower pollutant emissions of gasoline engines, and oxidation catalytic converters used in conjunction with an SCR (selective catalytic reduction) exhaust gas aftertreatment represents the state of the art in efforts to lower pollutant emissions of diesel engines. Particulate filters are used widely to minimize soot emissions of diesel vehicles and also can be found increasingly in gasoline applications.

This invention focuses on gaseous pollutants, namely hydrocarbons (HC), carbon monoxide (CO) and the nitrogen oxides (NOx). Gasuous pollutant control from gasoline engines relies upon a three way action that includes the oxidation of HC and CO to form $CO_2$ and $H_2O$ and the reduction of NOx to form $N_2+O_2$. Diesel systems have considerable excess of air in the oxidation catalytic converter and hence rely upon a two way reaction, namely the oxidation of HC and CO to form $CO_2$ and $H_2O$. In contrast, the NOx reduction in diesel systems proceeds substantially in the SCR catalytic converter with the addition of a reducing agent (aqueous urea solution).

The three way catalytic converters and the oxidation catalytic converters are of fundamentally identical construction. They consist of at least one ceramic carrier matrix with a very large number of small channels. A highly porous ceramic coating, known as a washcoat, is applied to the surface of each channel to increase the surface area considerably. Chemical catalysts, namely the precious metals platinum, palladium and rhodium, are embedded in the washcoat. A three way catalytic converter that has reached its operating temperature converts more than 99.9% of the gaseous pollutants into the non-hazardous reaction products.

The exhaust gas aftertreatment device and/or the catalytic converter must reach a certain minimum light-off temperature of approximately 300° C. for the reaction to take place. The reaction does not take place or takes place incompletely below that temperature. The heating of the catalytic converters takes place directly by means of the engine exhaust gas. This means that the exhaust gases leave the catalytic converter in a partially unconverted manner in the first seconds after the engine start before the light-off temperature is reached. More than 80% of the pollutants in the test cycle of a motor vehicle are produced before the light-off temperature is reached.

It was the aim of the previous developments to shorten the start-up time to a minimum. This has been achieved by the following approaches:
1. Reduction of the heat losses by way of the exhaust gas aftertreatment devices being positioned as close to the engine as possible and/or by way of the exhaust gas components being insulated.
2. Lowering of the light-off temperature by way of chemical optimization of the catalytic converter coating and the precious metal composition.
3. Improvement of the heat transfer from the exhaust gas to the catalytic converter by way of optimization of the incident flow onto the catalytic converter.
4. Increase of the enthalpy in the exhaust gas by way of special operating modes of the engine (catalytic converter heating).

Conventional measures are insufficient to achieve future emission standards. Moreover, these four approaches lead to disadvantages with respect to other aspects of vehicle operation. For example, approach 1 leads to a rise of permissible component temperatures during high load operation, and the relevant component protective measures generally lead to a rise in the $CO_2$ emissions. The same applies to approach 4, which likewise causes increased $CO_2$ emissions during catalytic converter heating operation.

Catalytic converter heating apparatuses are known and use an electric heating element to heat a metal catalytic converter by heat conduction and convection. The heating capacities, however, are limited by the existing 12 V on-board voltage in motor vehicles (battery capacity, high currents) or, in the case of a sufficient heating capacity, the necessity of a high voltage on-board power system (for example, 48 V) and the associated additional outlay are a disadvantage.

GB 2 254 014A discloses an exhaust gas system with two shut-off means arranged in a region of a bypass flow path, and just in front of the two connections of the bypass flow path and the main flow path. Flow therefore passes freely through the main flow path in every operating state of the exhaust gas system. The two shut-off means are closed during engine operation after the exhaust gas aftertreatment device of the main flow path has been heated. As a result, flow does not pass through the bypass flow path and therefore the bypass flow path is inactive. If, in contrast, the exhaust gas aftertreatment device of the main flow path is still cold, the two shut-off means of the bypass flow path are in their open position, and the heating apparatus and the fan are switched on. Therefore, heated gas is conveyed via the fan to and through the exhaust gas aftertreatment device. If the engine has not yet been started, exhaust gas does not yet flow from the engine through the main flow path. Thus, heated gas is conveyed extensively by the fan in the circuit from the bypass flow path to the main flow path and then back to the bypass flow path, apart from gas losses on account of the device, which is open from the engine to the end of the exhaust gas system.

If the engine has been started and the heating apparatus and the fan are still in operation, a diminished degree of efficiency of the heating apparatus is to be registered, because the heated gas conveyed via the fan is conveyed away to the end of the exhaust gas system.

DE 11 88 373 A describes an exhaust gas system that has a main flow path with a catalytic converter as an exhaust gas aftertreatment device. A bypass flow path is upstream of the catalytic converter. The bypass flow path has a smaller catalytic converter, and a heating apparatus upstream of the catalytic converter. A thermocouple measures the temperature of the exhaust gas, and the heating apparatus is switched on if the temperature is low. Thus, the exhaust gases that enter into the bypass flow path are heated and fed to the smaller catalytic converter. The exhaust gases in the bypass flow path therefore have a higher temperature in the opening region to the main flow path than the exhaust gases that pass through the main flow path.

WO 96/10686 A1 discloses an exhaust gas system having a catalytic converter as an exhaust gas aftertreatment device, a bypass flow path, and a fan arranged in the bypass flow path.

It is an object of the invention to develop an exhaust gas system where the minimum temperature of the exhaust gas aftertreatment device at which the reactions required for the exhaust gas aftertreatment can take place, is reached with a reduced energy requirement of the heating apparatus and the fan. The minimum temperature should be reached in a relatively short time. The light-off temperature ideally is reached during the engine start, and a direct conversion of the exhaust gases can take place. Furthermore, it is an object of the present invention to provide a method for operating an exhaust gas system of this type.

SUMMARY

The invention relates to an exhaust system that generates a hot air flow by way of a fan coupled to a heating apparatus, such as an electric heating apparatus. The hot air flow heats the exhaust gas aftertreatment device of the main flow path, in particular a catalytic converter or catalyst monolith in the present case. The heating takes place in a convective manner up to approximately 300° C. The gas within the system is circulated continuously, such as as in a wind tunnel, to use as little heating energy and fan performance as possible. For this reason, additional shut-off means in the main flow path are necessary, and this shut-off means "shuts in" the gas flow during heating operation.

An embodiment of the invention is described below with reference to the appended drawings without being restricted thereto.

DETAILED DESCRIPTION

Figure 1:
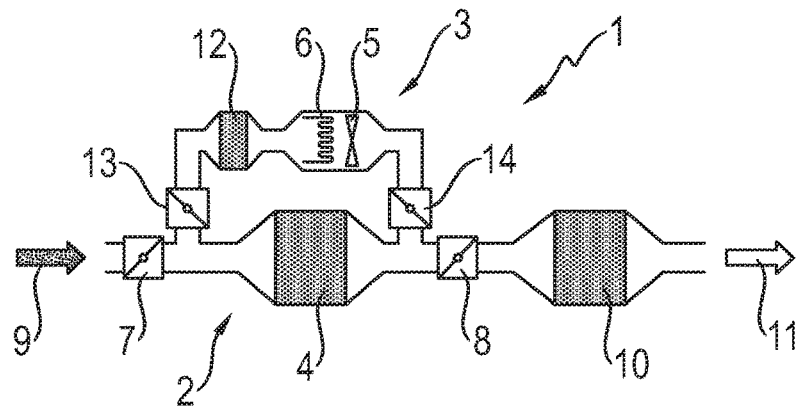
FIG. 1 is a schematic illustration of a design of the exhaust gas system, illustrated for its maximum configuration.

FIG. 1 illustrates components of the exhaust gas system of an internal combustion engine of a motor vehicle that are relevant for the invention, and particularly for the design of the system in a maximum configuration. This means that components can be dispensed with depending on the operating mode.

The exhaust gas system 1 shown in FIG. 1 has a main flow path 2 and a bypass flow path 3. The main flow path 2 has an exhaust gas aftertreatment device 4 (called merely a catalytic converter in the following text). The bypass flow path 3 has a fan 5 and a heating apparatus 6. The bypass flow path 3 has a first end connected to the main flow path 2 in a region upstream of the catalytic converter 4 and a second end connected to the main flow path 2 in a region downstream of the catalytic converter 4. A shut-off means 7 (for example, a butterfly valve) is arranged upstream of the connection of the bypass flow path 3 and the main flow path 2, and a further shut-off means 8 (for example, a butterfly valve) is arranged downstream of the connection of the bypass flow path 3 and the main flow path 2.

Unpurified exhaust gas 9 from an internal combustion engine is guided through the catalytic converter 4 and is converted there. The catalytic converter 4 will as a rule be a conventional three-way catalytic converter (gasoline) or a two-way catalytic converter (diesel). Subsequently, the converted exhaust gas optionally passes a further exhaust gas aftertreatment device 10 which can be configured as a particulate filter (gasoline and diesel) or as an SCR catalytic converter (diesel). As many further exhaust gas aftertreatment devices as desired can be connected downstream. The purified exhaust gas 11 is guided to a silencer system and finally passes into the atmosphere.

The catalytic converter 4 is heated by the engine exhaust gases, and also may be heated by an electric heater before starting the internal combustion engine. To this end, the heating apparatus 6, the fan 5 and a further exhaust gas aftertreatment device 12 (called merely a catalytic converter in the following text) are arranged in the bypass flow path 3. The catalytic converter 12 is substantially smaller than the catalytic converter 4. The bypass flow path 3 can be closed on the inlet side and on the outlet side by optional shut-off means 13, 14. The shut-off means 13, 14 are arranged in the bypass flow path 3 just before its openings into the main flow path 2.

Figure 2:
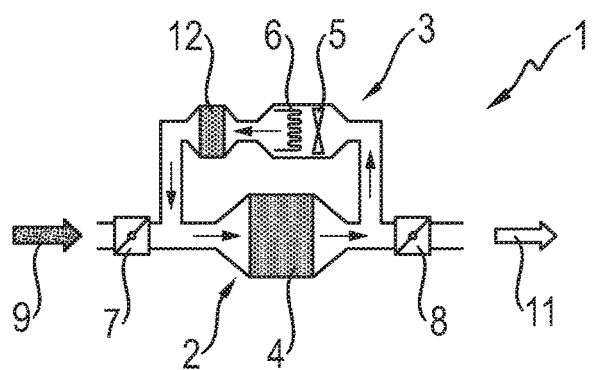
FIG. 2 is a schematic illustration of the design in the case of a reduced configuration for the catalytic converter heating operating mode.

FIG. 2 illustrates a simplified system.

In the catalytic converter heating operating mode, the two shut-off means 7, 8 are closed completely. The electric fan 5 is set in rotation and circulates the air flow (thin arrows) in the circuit that is then closed. The air mass flow is heated in a convective manner by the heating apparatus 6 and the heated air mass flow heats the two catalytic converters 4 and 12 by way of convection. The advantage of this arrangement is that considerably less fan and heating performance has to be applied on account of the closed system, since, after passing the catalytic converter 4, the air mass flow is again sucked in by the fan 5 and is heated further. The energy therefore is utilized very efficiently, since, after passing the catalytic converter 4, the air mass flow does not flow in the direction of the silencer system and accordingly does not output any energy to the environment. Therefore, the advantage is that the heating performance is reduced considerably and therefore either the heating time is reduced considerably and/or the heater itself can have smaller dimensions. The shut-off means 7 and 8 do not have to be sealed hermetically. Since only hot gas is circulated, leaks do not have any negative emission effects. The tighter the shut-off means 7, 8, however, the lower the heat losses and accordingly the lower the heating performance that has to be used. The catalytic converter 12 has no function during catalytic converter heating operation. Rather, it has a disadvantageous effect as a mass that has to be heated, but is necessary in engine operation, as described below. The light-off temperature can be sensed via a sensor or can be detected in a model-based manner. After the light-off temperature has been reached, the fan 5 and the heating apparatus 6 switch off, and the engine start is enabled via the engine control unit.

Figure 3:
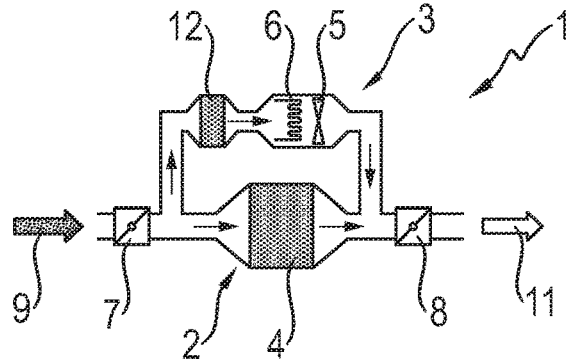
FIG. 3 is a schematic illustration of the system in the case of a reduced configuration for the engine operation operating mode.

FIG. 3 shows the operating mode of engine operation. The engine start takes place when the engine start has been enabled. At precisely this moment, the two shut-off means 7, 8 open the main flow path 2. The exhaust gases 9 from the internal combustion engine pass the catalytic converter 4, are converted into non-hazardous gases 11 there, and finally are fed to the further exhaust gas aftertreatment or are fed in a purified state to the silencer system. A leakage mass flow past the catalytic converter 4 is produced by way of the bypass flow path 3. However, the small catalytic converter 12 is arranged in the bypass flow path 3 so that the leakage mass flow also experiences an exhaust gas conversion. After passing the small catalytic converter 12, the heating apparatus 6 and the fan 5, the two paths are combined again to form a common path that conducts the total mass flow 11 to the silencer system.

The invention is of particular use for hybrid vehicles. Depending on the use behavior, the internal combustion engine may not run for long time periods while the vehicle is being operated electrically, for example during city operation. This can lead to the catalytic converter 4 cooling below its light-off temperature. In the case of a high power request, no exhaust gas conversion or an insufficient exhaust gas conversion will initially take place when restarting of the internal combustion engine. The problem can be avoided by keeping the catalytic converter 4 warm by the described invention during electric driving (see the above explanations in respect of the catalytic converter heating operating mode).

Figure 4:
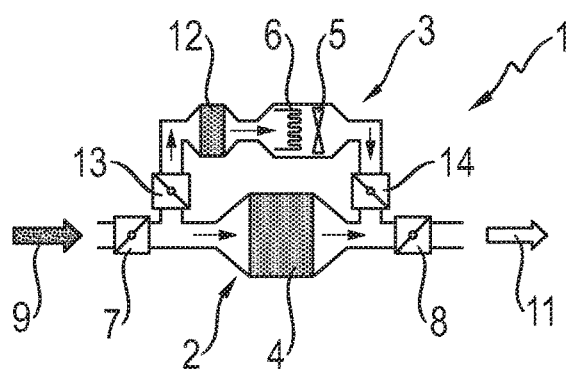
FIG. 4 is a schematic illustration of the system in the case of a maximum configuration for the engine operation operating mode with additional shut-off means.

FIG. 4 illustrates the engine operation operating mode with additional shut-off means 13 and 14 (for example, throttle valves, butterfly valves or disk valves) arranged in the bypass flow path 3. The additional shut-off means 13, 14 are completely open during the catalytic converter heating operation and have practically no influence there. During engine operation, the two shut-off means 13, 14 are closed completely and shut off the bypass flow path 3 virtually completely. The advantage lies in the fact that the heating apparatus 6, the fan 5 and the catalytic converter 12 are protected against the extremely high temperatures and exhaust gas mass flows that occur during high load operation. If customary shut-off members (throttle valves) are used in the exhaust gas region, although a minimum leakage mass flow will be set, this is considerably smaller than the bypass mass flow without the shut-off devices (see FIG. 2) and leads to considerably lower component loads of the components that are arranged in the bypass flow path 3. The minimum bypass mass flow nevertheless has to experience an exhaust gas conversion. Therefore, the catalytic converter 12 is likewise necessary in such an arrangement. A certain minimum mass flow is even necessary so that the catalytic converter 12 does not fall below its light-off temperature during engine operation and can always convert the bypass mass flow reliably. This is achieved by an infinitely variable regulation of the two shut-off members 13 and 14.

In a further embodiment (not illustrated in greater detail) of the system, two of the two shut-off members 7 and 13 or 8 and 14 are combined to form a 3/2-way valve that can alternately shut off and open the main flow path 2 or the bypass flow path 3.

In a further advantageous embodiment of the system, the shut-off members 13 and 14 are of hermetically sealed configuration. In this case, the additional catalytic converter 12 can be dispensed with completely, since no leakage mass flow can occur in the bypass flow path 3 during engine operation in the case of closed shut-off means 13, 14 and therefore no exhaust gas conversion has to take place either. The advantage lies in the simplification of the system design and additionally in a further reduced heating time as a consequence of the thermal mass of the additional catalytic converter 12, which is dispensed with.

LIST OF DESIGNATIONS

1 Exhaust gas system
2 Main flow path
3 Bypass flow path
4 Exhaust gas aftertreatment device/catalytic converter
5 Fan
6 Heating apparatus
7 Shut-off means
8 Shut-off means
9 Unpurified exhaust gas
10 Exhaust gas aftertreatment device
11 Purified exhaust gas
12 Exhaust gas aftertreatment device/catalytic converter
13 Shut-off means
14 Shut-off means

What is claimed is:

1. An exhaust gas system having a main flow path with an upstream end, a downstream end and an exhaust gas aftertreatment device between the upstream end and the downstream end, and a bypass flow path having a fan and a heating apparatus, the bypass flow path has a first end connected to the main flow path upstream of the exhaust gas aftertreatment device and a second end connected to the main flow path downstream of the exhaust gas aftertreatment device, and the exhaust gas system having a first shut-off means arranged in the main flow path upstream of the first end of the bypass flow path and upstream of the exhaust gas aftertreatment device and a second shut-off means arranged in the main flow path downstream of the second end of the bypass flow path and downstream of the exhaust gas aftertreatment device, so that the first and second shut-off means, when closed, create a closed loop that has the exhaust gas aftertreatment device, the fan and the heating apparatus to heat the exhaust gas aftertreatment device before allowing exhaust gas to flow to the downstream end of the exhaust gas system.

2. The exhaust gas system of claim 1, further comprising a bypass exhaust gas aftertreatment device in the bypass flow path.

3. The exhaust gas system of claim 2, further comprising at least one bypass shut-off means in the bypass flow path for completely or partially shutting off the bypass flow path.

4. The exhaust gas system of claim 3, wherein the bypass shut-off means is in a region of at least one end of the bypass flow path.

5. The exhaust gas system of claim 3, wherein the bypass shut-off means comprise a butterfly valve or a disk valve.

6. The exhaust gas system of claim 3, wherein one of the first and second shut-off means and one of the bypass shut-off means are combined to form a 3/2-way valve.

7. The exhaust gas system of claim 2, wherein at least one of the bypass exhaust gas aftertreatment device and the exhaust gas aftertreatment device of the main flow path is a catalytic converter.

8. The exhaust gas system of claim 1, wherein the fan is an electric fan and the heating apparatus is an electric heating apparatus.

9. The exhaust gas system of claim 1, wherein the first and second shut-off means are butterfly valves.

10. The exhaust gas system of claim 1, wherein parts of the exhaust gas system that conduct exhaust gas are thermally insulated.

11. A method for operating an exhaust gas system of an internal combustion engine, the exhaust gas system having a main flow path and an exhaust gas aftertreatment device in the main flow path, the method comprising: identifying a request to start the internal combustion engine; determining whether the exhaust gas aftertreatment device is at a light-off temperature, closing shut-off means of the main flow path upstream and downstream of the exhaust gas aftertreatment device; operating a fan to circulate gas through a bypass flow path and the exhaust gas aftertreatment device while operating a heating apparatus in the bypass flow path; and opening the shut-off means of the main flow path when the exhaust gas aftertreatment device reaches the light-off temperature.

12. The method of claim 11, further comprising swithing off the heating apparatus and the fan after the exhaust gas aftertreatment device of the main flow path reaches the light-off temperature.

13. The method of claim 12, further comprising starting the internal combustion engine associated with the exhaust gas system after the light-off temperature of the exhaust gas aftertreatment device of the main flow path is reached.

14. The method of claim 13, further comprising directing part of an exhaust gas flow through the bypass flow path for heating the bypass exhaust gas aftertreatment device after the first and second shut-off means are open.

* * * * *